(12) United States Patent
Payne et al.

(10) Patent No.: US 9,085,350 B2
(45) Date of Patent: Jul. 21, 2015

(54) AIRCRAFT WING COVER COMPRISING A SANDWICH PANEL AND METHODS TO MANUFACTURE AND DESIGN THE SAID WING COVER

(75) Inventors: Christopher Payne, Bristol (GB); Peter Griggs, Bristol (GB); Antony C Peacock, Bristol (GB); Raymond Bullock, Bristol (GB); Glenn Watson, Bristol (GB)

(73) Assignee: Airbus Operations Limited, Bristol (GB)

( * ) Notice: Subject to any disclaimer, the term of this patent is extended or adjusted under 35 U.S.C. 154(b) by 391 days.

(21) Appl. No.: 13/521,787

(22) PCT Filed: Jan. 14, 2011

(86) PCT No.: PCT/GB2011/050049
§ 371 (c)(1),
(2), (4) Date: Jul. 12, 2012

(87) PCT Pub. No.: WO2011/089413
PCT Pub. Date: Jul. 28, 2011

(65) Prior Publication Data
US 2013/0099058 A1    Apr. 25, 2013

(30) Foreign Application Priority Data
Jan. 20, 2010  (GB) .................................. 1000878.7

(51) Int. Cl.
*B64C 1/00* (2006.01)
*B64C 3/20* (2006.01)
*B29C 70/08* (2006.01)
(Continued)

(52) U.S. Cl.
CPC ................. *B64C 3/20* (2013.01); *B29C 70/086* (2013.01); *B29C 70/088* (2013.01); *B29C 70/865* (2013.01); *B29C 70/887* (2013.01); *B29D 99/0021* (2013.01); *B64C 3/26* (2013.01); *B29K 2105/043* (2013.01); *B29L 2031/3085* (2013.01);
(Continued)

(58) Field of Classification Search
USPC .......... 244/123.1, 123.3, 123.14, 123.2, 123.7
See application file for complete search history.

(56) References Cited

U.S. PATENT DOCUMENTS

| 4,606,961 A | 8/1986 | Munsen et al. |
| 5,683,646 A * | 11/1997 | Reiling, Jr. .................... 264/512 |

(Continued)

FOREIGN PATENT DOCUMENTS

| EP | 1 719 924 | 11/2006 |
| FR | 2 740 378 | 4/1997 |

(Continued)

OTHER PUBLICATIONS

International Search Report for PCT/GB2011/050049, mailed May 23, 2011.
(Continued)

*Primary Examiner* — Christopher P Ellis
(74) *Attorney, Agent, or Firm* — Nixon & Vanderhye P.C.

(57) ABSTRACT

An aircraft wing cover (10) comprising an integrally stiffened sandwich panel including first and second skins (11, 12) sandwiching a core layer (13), wherein at least one of the skins has a plurality of spanwise extending integral regions of increased thickness (18) accommodated by corresponding regions (19) of decreased thickness in the core. Also, a method of fabricating an aircraft wing cover, and a method of designing an aircraft wing.

20 Claims, 4 Drawing Sheets

(51) Int. Cl.
*B29C 70/86* (2006.01)
*B29C 70/88* (2006.01)
*B29D 99/00* (2010.01)
*B64C 3/26* (2006.01)
*B29K 105/04* (2006.01)
*B29L 31/30* (2006.01)
*B29L 31/60* (2006.01)

(52) U.S. Cl.
CPC .......... *B29L 2031/608* (2013.01); *Y02T 50/433* (2013.01); *Y10T 156/1074* (2015.01)

(56) References Cited

U.S. PATENT DOCUMENTS

| | | | | |
|---|---|---|---|---|
| 6,217,000 | B1* | 4/2001 | Younie et al. | 249/184 |
| 6,513,757 | B1* | 2/2003 | Amaoka et al. | 244/123.7 |
| 7,681,835 | B2* | 3/2010 | Simpson et al. | 244/123.3 |
| 7,837,148 | B2* | 11/2010 | Kismarton et al. | 244/123.1 |
| 8,283,018 | B2* | 10/2012 | Lloyd | 428/99 |
| 8,398,024 | B2* | 3/2013 | Tucker | 244/123.1 |
| 2006/0110588 | A1 | 5/2006 | Merriman | |
| 2010/0077690 | A1* | 4/2010 | Durand | 52/578 |

FOREIGN PATENT DOCUMENTS

| | | |
|---|---|---|
| GB | 790253 | 2/1958 |
| GB | 2 428 417 | 1/2007 |
| JP | 6-191489 | 7/1994 |
| RU | 2 112 698 | 6/1998 |
| WO | WO 92/02410 | 2/1992 |
| WO | WO 92/02731 | 2/1992 |
| WO | WO 01/58680 | 8/2001 |

OTHER PUBLICATIONS

Written Opinion of the International Searching Authority for PCT/GB2011/050049, mailed May 23, 2011.
Uk Search Report for GB Application No. 1000878.7, dated May 19, 2010.
Karlsson, K.F. et al., "Manufacturing and applications of structural sandwich components", Composites Part A, 28A, (1997), pp. 97-111.
Kress, G., "Design Criteria", In: D.B. Miracle & S.L. Donaldson: "Composites", vol. 21, (Dec. 2001), pp. 353-359, XP-002628833.
Guillermin, O. et al., "Computer-Aided Design and Manufacturing", In: D.B. Miracle & S.L. Donaldson: "Composites", (Dec. 2001), vol. 21, pp. 366-372, XP002628834.

* cited by examiner

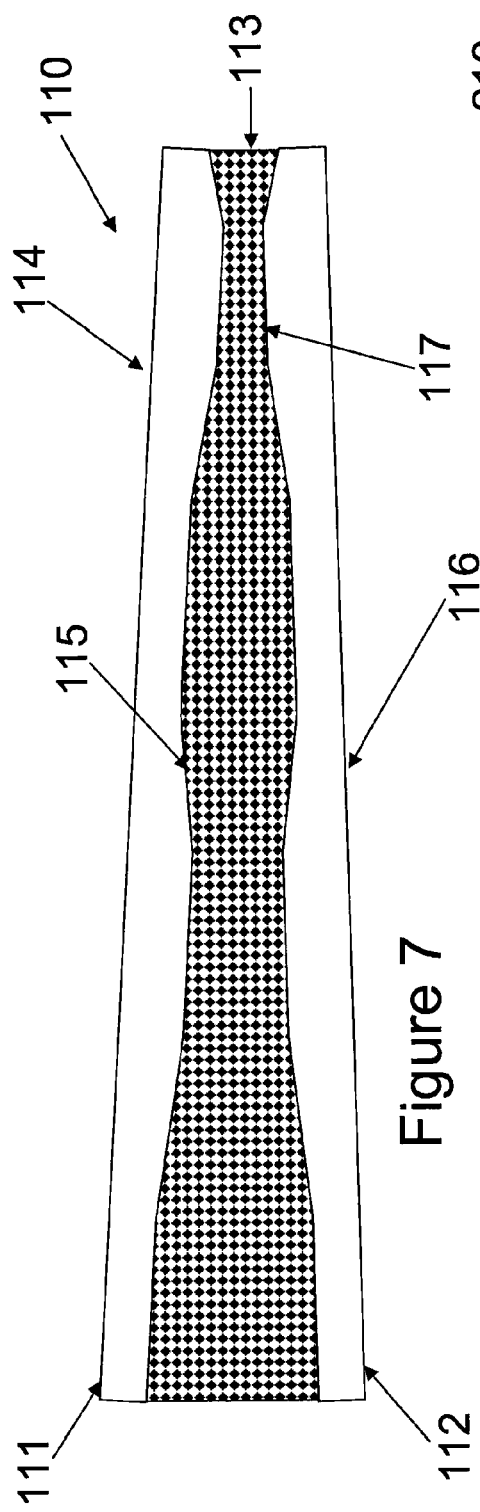
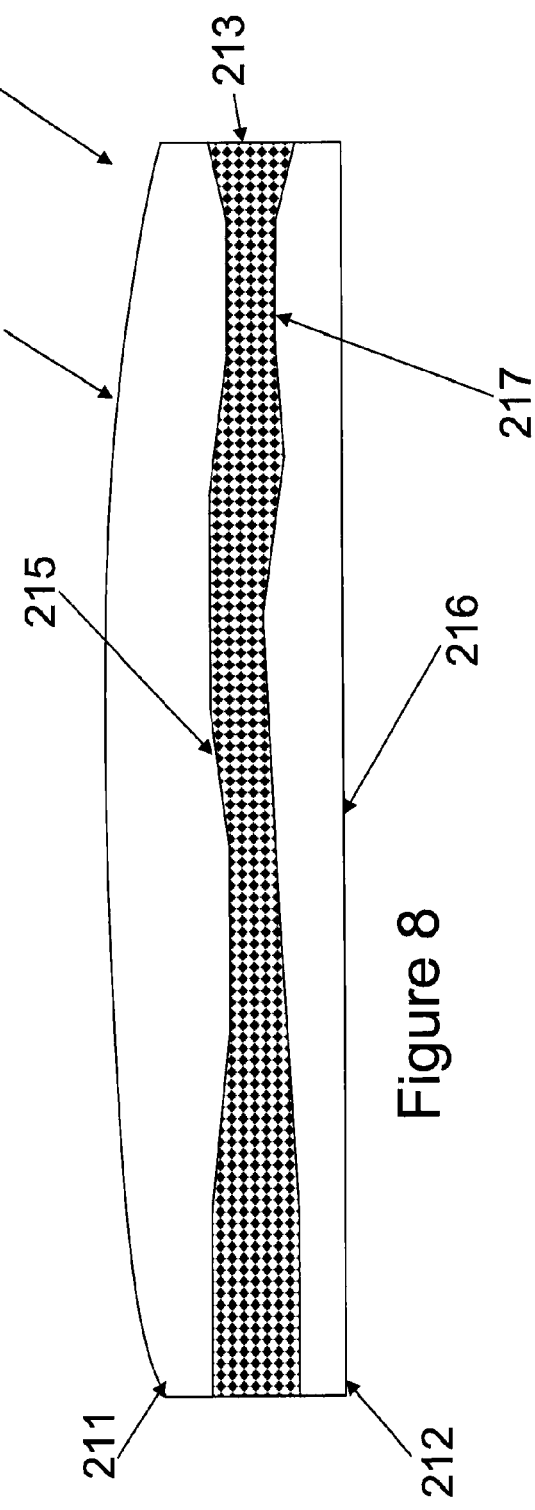
Figure 7
Figure 8

AIRCRAFT WING COVER COMPRISING A SANDWICH PANEL AND METHODS TO MANUFACTURE AND DESIGN THE SAID WING COVER

This application is the U.S. national phase of International Application No. PCT/GB2011/050049, filed 14 Jan. 2011, which designated the U.S. and claims priority to GB Application No. 1000878.7, filed 20 Jan. 2010, the entire contents of each of which are hereby incorporated by reference.

FIELD OF THE INVENTION

The present invention relates to an aircraft wing cover comprising a sandwich panel including first and second skins sandwiching a core layer. The invention also relates to an aircraft wing including the cover, a method of fabricating an aircraft wing cover, and a method of designing an aircraft wing.

BACKGROUND OF THE INVENTION

With the use of composite materials becoming more prevalent within the aircraft industry, it has become apparent that issues relating to the control of interfaces between components of large, complex, composite structures have become more of a challenge. In the case of an aircraft wing, the interfaces between wing spars, ribs and covers (skins) for a commercial airliner, for example, are particularly difficult to control. This is primarily due to the difficulty in controlling the through thickness tolerance associated with complex laminate composite components, especially when there are ramps (thickness variations) within these components.

This problem is a function of both the through thickness tolerance of individual plies within the laminate, as well as the location of the ply edges, which varies both the location and angle of the ramp. This can cause significant issues with respect to the interface profile of the components, and can lead not only to problems during the manufacturing phase, requiring extensive interface machining to generate the desired interface profile, but also during the design phase of the components.

A traditional sandwich panel has a constant thickness core layer used to afford structural rigidity. Previously, there has been a tendency to import traditional aircraft design philosophies, as developed for metallic aircraft construction, into composite aircraft design. In the case of an aircraft wing cover, reinforcing elements such as spanwise stringers have traditionally been integrally formed with an outer surface of a composite sandwich panel.

The highly complex ramped surface created by integrally forming the stringers with the laminate skin forms the interfacing surface of the cover with the ribs and spars. Through thickness tolerance issues associated with a complex ramped surface makes it very difficult to control the profile of this critical interfacing surface during manufacture. Also, variations in the cover/stringer design during the wing design phase directly impact on the dimensions of the ribs and spars. Therefore, the design of the spars and ribs cannot be finalised until the design of the cover/stringers, and thus the interface, has been finalised. This has a significant impact on the potential for concurrent design of the wing structure as a whole. This leads to increases in the overall design cycle of the components and hence additional cost.

SUMMARY OF THE INVENTION

A first aspect of the invention provides an aircraft wing cover comprising an integrally stiffened sandwich panel including first and second skins sandwiching a core layer, wherein at least one of the skins has a plurality of spanwise extending integral regions of increased thickness accommodated by corresponding regions of decreased thickness in the core.

A second aspect of the invention provides an aircraft wing structure comprising a front spar, a rear spar, a plurality of chordwise ribs, and upper and lower wing covers, wherein the wing covers are in accordance with the first aspect and are fixed to the spars and ribs.

A third aspect of the invention provides a method of fabricating an aircraft wing cover, the method comprising the steps of: a) forming first and second skins; and b) forming a sandwich panel comprising the first and second skins sandwiching a core layer, wherein at least one of the skins has a plurality of spanwise extending integral regions of increased thickness accommodated by corresponding regions of decreased thickness in the core.

A fourth aspect of the invention provides a method of designing an aircraft wing, comprising the steps of: i) defining and fixing an outer aerodynamic profile of the wing; ii) predicting loads on the wing based on the wing profile; iii) determining and fixing outer surfaces of two integrally stiffened sandwich panels which will form upper and lower covers for the wing based on the predicted loads; and then iv) detailed designing of the integrally stiffened sandwich panels, which each include first and second skins sandwiching a core layer, wherein at least one of the skins has a plurality of spanwise extending integral regions of increased thickness accommodated by corresponding regions of decreased thickness in the core.

The invention is advantageous in that the core layer is used to absorb the structural complexity within the panel thickness. The laminate architecture is located at the skin to core interface, rather than at the outer surface of the panel. This enables the outer surfaces of the sandwich panel to be fixed early on in the design process, and to be manufactured accurately to that specification. Other interfacing components, such as the ribs and spars, within the aircraft wing assembly can be designed concurrently within a known boundary.

Whilst the wing cover includes integral spanwise stiffeners (analogous to traditional stringers) it is contemplated that additional stringer components may be attached to the interior surface of the sandwich panel where desired, e.g. in high stress areas. This may be desirable, or even necessary, where the structural reinforcement cannot be easily incorporated within the panel itself for a given panel thickness.

In addition to spanwise reinforcement, at least one of the skins may have a chordwise extending integral region of increased thickness accommodated by a region of decreased thickness in the core. In this way, it may be possible to reduce the number of ribs required in the aircraft wing, resulting in reduced part count, fasteners, assembly time etc.

The skins may each have a laminate construction. The regions of increased skin thickness may include a ramp to a region having a greater number of laminate plies. The skins may comprise fibre-reinforced plastic, such as carbon fibre-reinforced epoxy, for example.

The core layer may comprise a hollow cell material. This may be a closed cell foam, such as Rohacell™, a honeycomb, such as Nomex™, or any other suitable sandwich core materials as will be appreciated by those skilled in the art.

The skins may be formed by laying up a series of plies to form a laminate skin. The plies may be laid on a mould tool to accurately define the outer surface of each skin. The sandwich panel may be formed by arranging the skins so as to define a space between them, and filling the space with material to form the core layer sandwiched by the skins. For example, a foam may be introduced into the space between the skins and allowed to cure. Alternatively, the sandwich panel may be created by forming a core layer, and arranging the skins so as to sandwich the core. A block of open cell material may be machined or cut to a profile substantially matching the inner surfaces of the skins.

BRIEF DESCRIPTION OF THE DRAWINGS

Embodiments of the invention will now be described with reference to the accompanying drawings, in which:

FIG. 7 illustrates a partial section view of an alternative wing cover, having non-parallel outer surfaces and being symmetrical about the core; and FIG. 8 illustrates a partial section view of a further alternative wing cover, having an arcuate outer surface and being asymmetrical about the core.

DETAILED DESCRIPTION OF EMBODIMENT(S)

Figure 1:
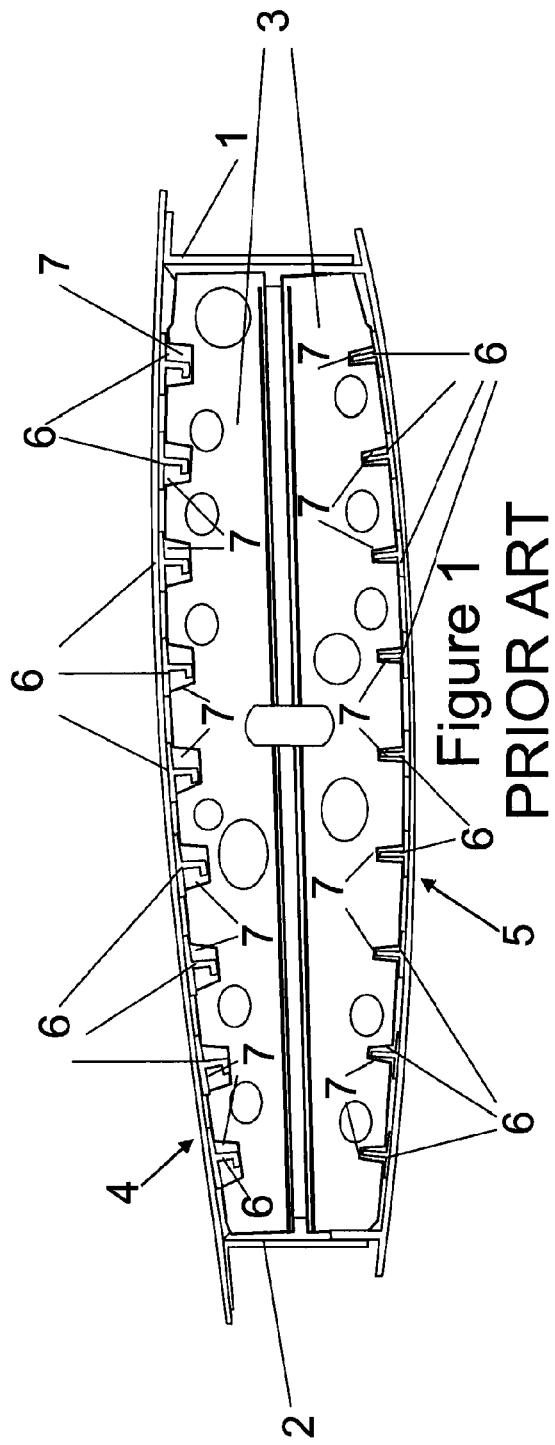
FIG. 1 illustrates a section view through a conventional aircraft wing box, showing front and rear spars, a chordwise two-part rib, and upper and lower covers having spanwise extending stringers.

FIG. 1 shows a conventional aircraft wing box comprising a front spar 1, a rear spar 2, a two part chordwise rib 3, an upper wing cover 4 and a lower wing cover 5. The wing covers 4, 5 have a plurality of spanwise extending stringers 6 attached to, or integrally formed with, interior surfaces of the wing covers 4, 5. The rib 3 is attached to the covers 4, 5 by conventional rib feet (not shown). The rib 3 includes cut outs 7 to permit the stringers 6 to pass uninterrupted through the rib 3.

As will be appreciated by those skilled in the art, the wing of FIG. 1 has several of the chordwise ribs 3 spaced spanwise across the wing. Whilst the stringers 6 of the upper cover 4 are different to the stringers of the lower cover 5, this is purely a matter of design choice according to the loading requirements. Whilst a two part rib 3 is shown in FIG. 1, a single piece rib may alternatively be provided.

It is clear from FIG. 1 that the interface between the rib 3 and the interior surfaces of the upper and lower covers 4, 5 is complex, which leads to tolerance issues during assembly of the wing box.

Figure 2:
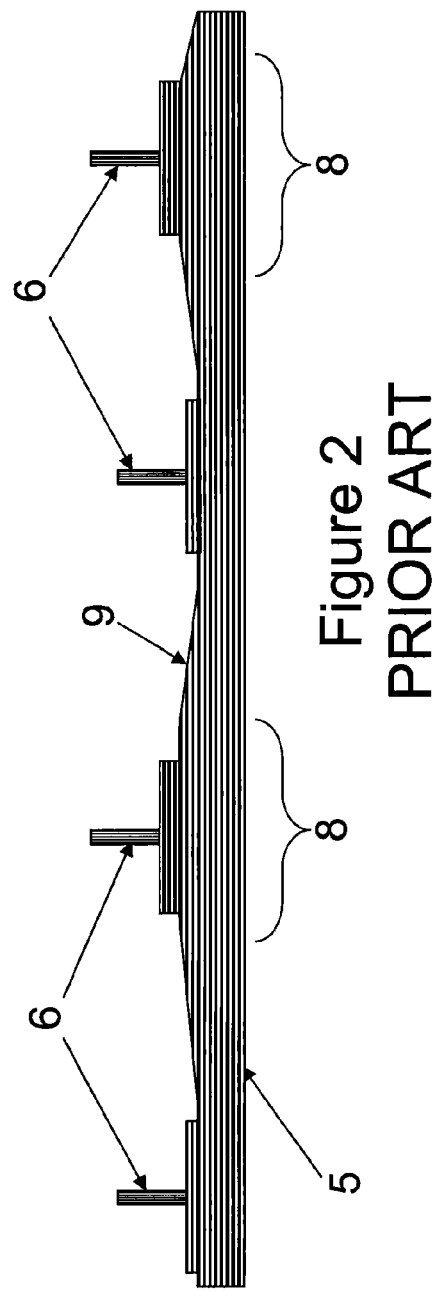
FIG. 2 illustrates a detailed partial section view through the conventional wing cover.

FIG. 2 shows a detailed partial section view of the lower wing cover 5 having the stringers 6. The cover 5 and the stringers 6 are formed of fibre reinforced plastic, such as carbon fibre reinforced epoxy resin, for example. In an attempt to optimise the use of fibre reinforced composite materials, the cover 5 has regions of increased thickness 8. These are formed by creating a stack of a greater number of the fibre reinforced laminate plies. To avoid stress concentrations, a ramp 9 of increasing ply thickness is formed between a reduced thickness region and the increased thickness region 8. A ramp rate of 1:20 is considered to be a current design maximum. The location of the stringers 6 is currently dictated by the pitch of the fuselage frame, such that some of the stringer terminations at the wing root are coincident with the fuselage frames.

Under current design practice, it is generally assumed that the stringer pitch is one third of the fuselage frame pitch. As can be seen from FIG. 2, the stringers 6 are generally located at regions of constant cover thickness. Not only is it difficult to fix or bond the stringers 6 to the inner surface of the cover 5 on the ramps 9, but also the ability of the stingers 6 to adequately stiffen the cover 5 when they are set at an angle on the ramps 9 is significantly diminished. The limitations of stringer pitch and cover thickness ramp rate generally lead to a sub-optimal wing box design in which the thickness of the wing covers is generally too high. This imposes a significant weight penalty and it is thought that there is little room for further optimisation of wing box design using current design methodologies which have generally been handed down from previous metallic wing box designs.

In addition, the complexity of attaching the rib 3 to the highly complex inner surface of the covers 4, 5 having the stringers 6 poses significant issues for both the design and manufacturability of the wing box. The interior volume of an aircraft wing box is typically used as a fuel tank and hence appropriate sealing arrangements must be provided. Owing to the significant variation in dimension of composite components it is often necessary to machine the interface between components to be joined at the assembly stage to ensure the components meet with the desired tolerance. Moreover, during the design phase it can be seen that a change in the thickness of the wing cover, for example, will impact upon the design of the stringers, the ribs and the spars. This dependency leads to significant increases in the overall design cycle and thus additional cost.

Figure 3:
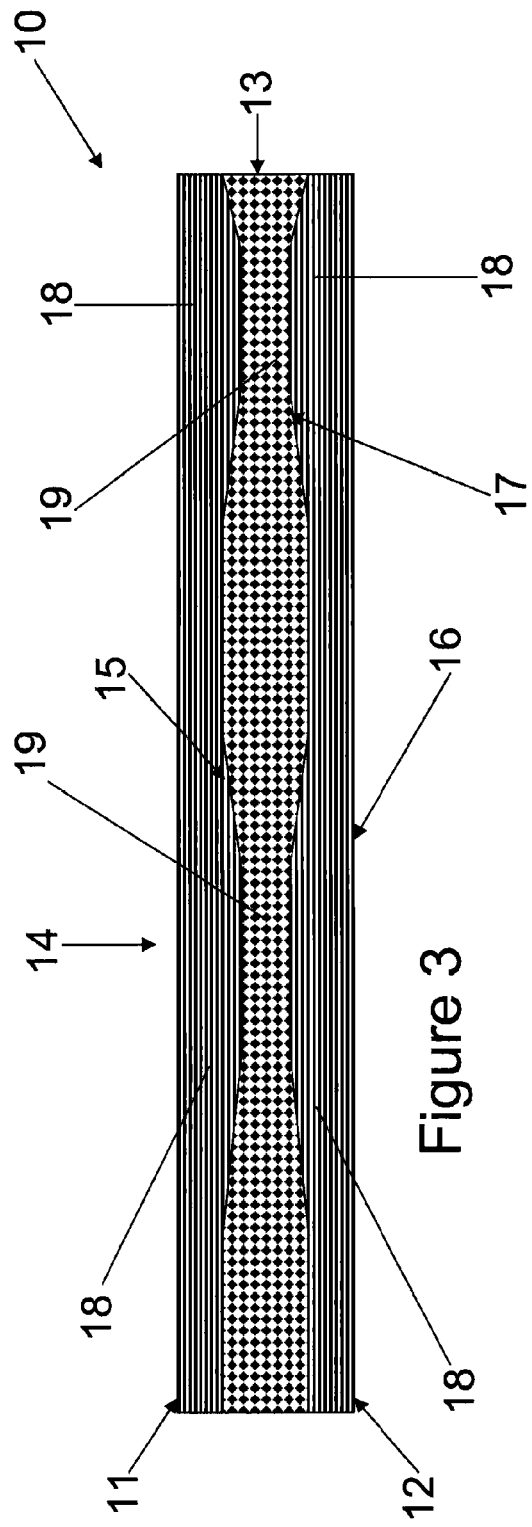
FIG. 3 illustrates a partial section view of a wing cover of this invention having a sandwich panel construction and integral spanwise stiffeners at the skin/core interfaces.

Turning now to FIG. 3 there is shown an aircraft wing cover 10 comprising an integrally stiffened sandwich panel including a first skin 11 and a second skin 12 sandwiching a core layer 13. The first skin 11 has an outer surface 14 and an inner surface 15. The second skin 12 has an outer surface 16 and an inner surface 17. The outer surfaces 14, 16 of the wing cover 10 constitute internal and external surfaces of the wing cover, respectively. By contrast with the wing cover of FIG. 2, it can be seen that the internal surface 14 of the wing cover 10 is a far simpler interfacing surface for joining to ribs and spars to form an aircraft wing box structure. The complex architecture of the wing cover 10 is located at the skin/core interfaces at the surfaces 15, 17. As can be seen from FIG. 3, the skins 11, 12 have a plurality of spanwise extending integral regions of increased thickness 18. These are accommodated by corresponding regions 19 of decreased thickness in the core 13.

The wing cover 10 is symmetrical about the core 13 and has substantially parallel outer surfaces 14, 16. However, other sandwich panel constructions for the wing cover are envisaged within the scope of this invention as will be described later with reference to FIGS. 7 and 8.

The first and second skins 11, 12 each comprise a stack of fibre reinforced laminate plies. The plies may comprise carbon fibre reinforced epoxy resin, for example. However, other fibre reinforced plastics could also be used, such as glass fibre reinforced plastic and fibre reinforced thermoplastics, for example. The core layer 13 may comprise any open or closed cellular structure. For example, a closed cell foam, such as Rohacell™, or a honeycomb structure, such as Nomex™ may be used.

Figure 4:
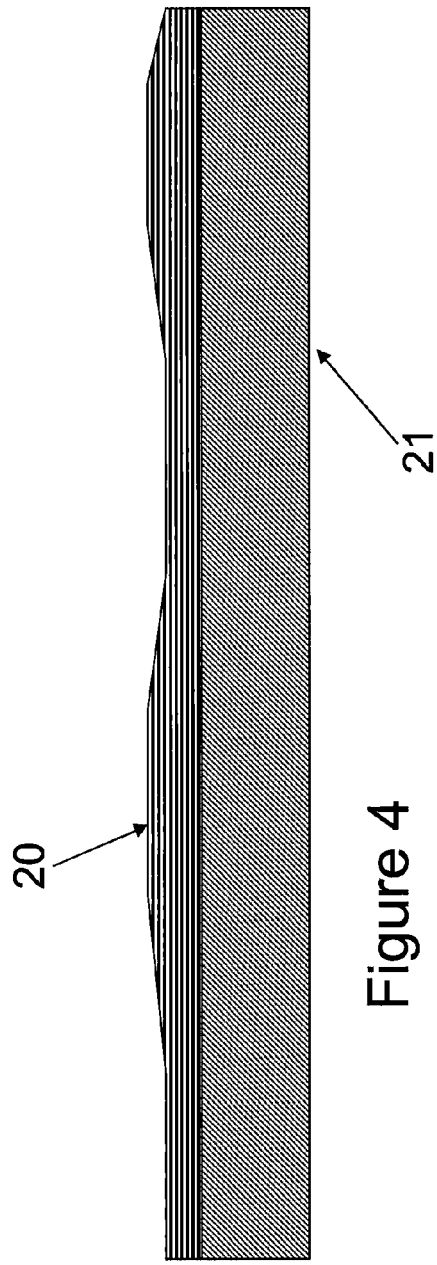
FIG. 4 illustrates a partial section view of one of the laminate skins being laid up on a mould tool.

A method of fabricating the aircraft wing cover 10 will now be described with reference to FIGS. 4 to 6. As shown in FIG. 4, a series of laminate plies 20 are laid up on a mould tool 21 to a desired thickness. The upper surface of the mould tool forms the outer mould line of the stack of plies 20. In this way, the ply laid first will accurately conform to the outer mould line and will form the outer surface of one of the skins 11, 12. Different numbers of plies are laid up in different regions according to structural design requirements. In a preferred embodiment, the plies 20 are laid up on the mould tool 21 by an automatic tape laying machine, for example. Alternatively, a manual ply lay up may also be used. This process is repeated to form the first and second skins 11, 12.

Figure 5:
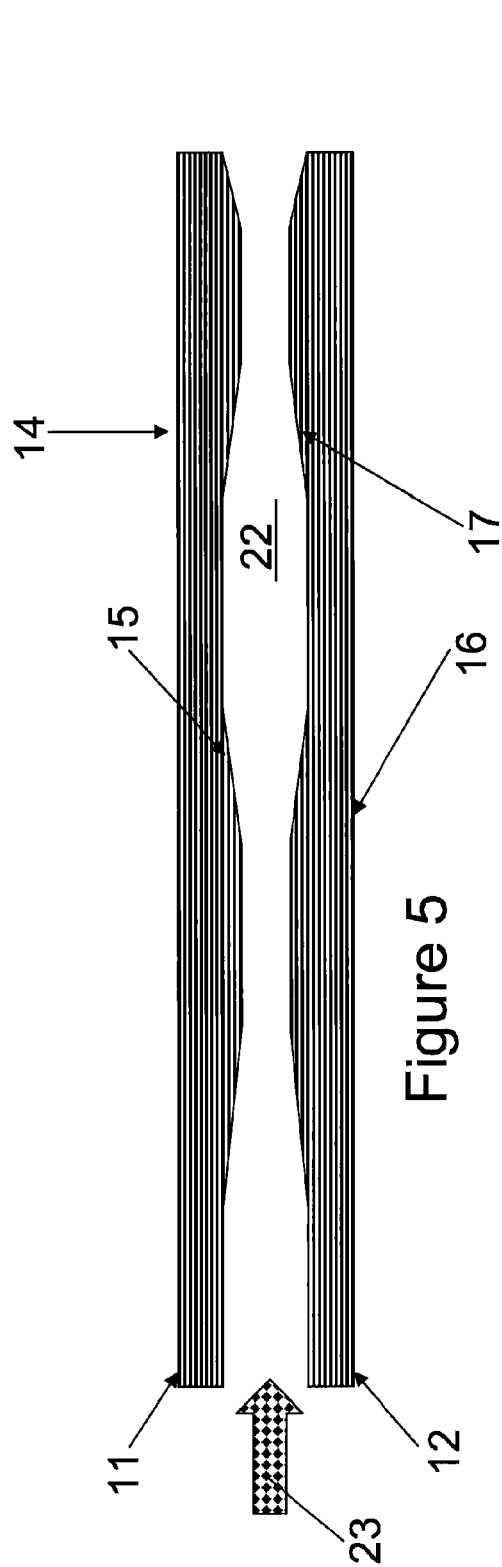
FIG. 5 illustrates a partial section view of a liquid foaming core material being injected into a cavity between the two integrally stiffened skins to form the sandwich panel.

Turning now to FIG. 5 there is shown a first method of forming the sandwich panel wing cover 10. The first and second skins 11, 12 are positioned so as to define a space 22 between the skins. A foaming resin 23 is injected to completely fill the space 22. The foaming resin 23 forms the core layer 13 once it has been given time to cure. This curing process bonds the core layer 13 to the inner surfaces 15, 17 of the first and second skins 11, 12 respectively. The resultant sandwich panel wing cover 10 is as shown in FIG. 3.

Figure 6:
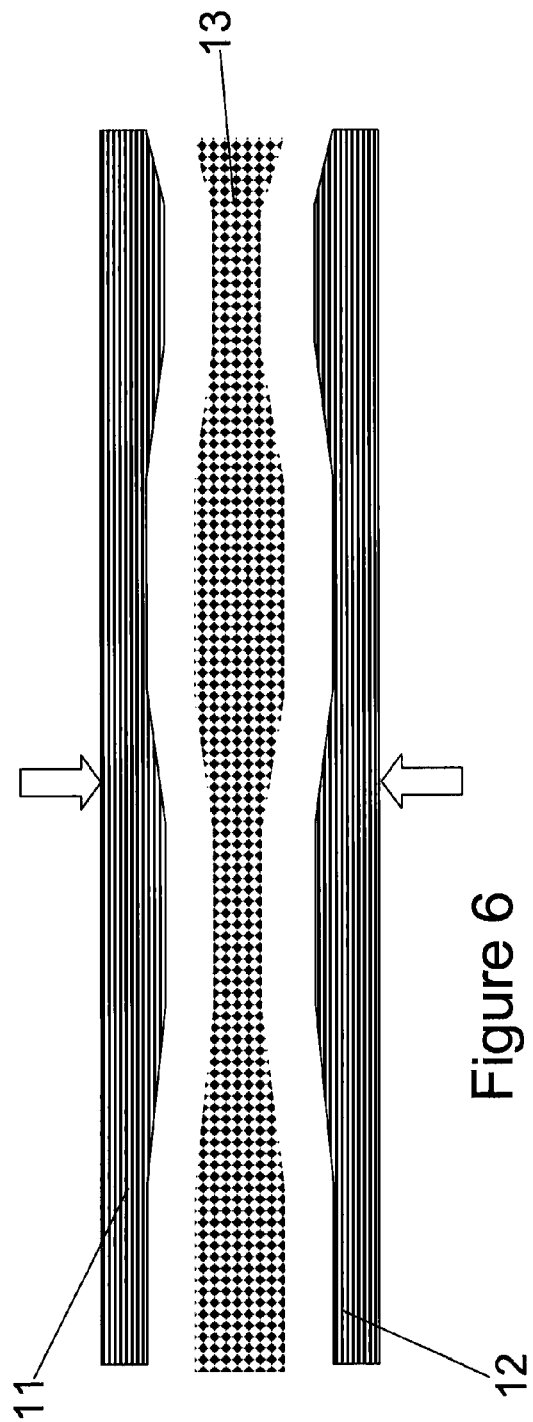
FIG. 6 illustrates a partial section view of a rigid core layer being sandwiched between the two integrally stiffened skins to form the sandwich panel.

FIG. 6 shows an alternative method of forming the wing cover 10. In the alternative method, the core layer 13 is formed and then the skins 11, 12 are arranged so as to sandwich the core layer 13. In this method, the core layer 14 may be formed of a closed cell foam, such as Rohacell™. This type of foam is substantially rigid and so can be machined to a desired profile to match that of the inner surfaces 15, 17 of the skins 11, 12. The closed cell foam is slightly compressible which can beneficially account for some manufacturing tolerances.

In a preferred example, the skins 11, 12 are each laid up simultaneously upon respective mould tools 21 using a tape laying machine to lay up a stack of pre-impregnated fibre reinforced composite plies 20. The machined core layer 13 is applied to the inner surface of one of the skins, and then the other skin is inverted and positioned with its inner surface facing the core layer 13. The "wet" pre-preg skins 11, 12 are then cured under pressure such that excess resin from the skins is used to bond the skins 11, 12 to the core layer 13. Alternatively, the skins 11, 12 may be pre-cured prior to assembly with the core layer 13, in which case a layer of adhesive film may be applied to the interfaces between the skins 11, 12 and the core layer 13 so as to bond the skins to the core layer.

In a further alternative embodiment, the core layer 13 may be machined of a rigid honeycomb material, such as Nomex™. Honeycomb materials are generally incompressible and so will need to be accurately machined to the correct profile to mate with the inner surfaces 15, 17 of the skins 11, 12.

In the above described embodiments. The sandwich panel wing cover 10 formed is substantially symmetrical about the panel centre line, that is to say the panel is symmetrical about the core. In addition, the outer surfaces 14, 16 of the panel are substantially parallel. However, the sandwich panel wing cover need not be parallel sided, nor symmetrical as can be seen from the alternative embodiments shown in FIGS. 7 and 8, which will be described in detail below.

FIG. 7 shows a first alternative embodiment of a sandwich panel wing cover 110 comprising first and second skins 111, 112 sandwiching a core layer 113. The wing cover 110 is symmetrical about the core 113, but the outer surfaces 114, 116 are not parallel. This is beneficial so as to give the aircraft designer greater freedom to design the wing cover 110 to an optimal local panel thickness.

Moreover, as can be seen from FIG. 8, a second alternative sandwich panel wing cover 210 has first and second skins 211, 212 sandwiching a core layer 213. The skins 211, 212 are asymmetrical about the core 213. The outer surfaces 214, 216 of the wing cover 210 are not parallel. The outer surface 216 which forms the internal surface of the wing cover 210 is substantially planar whereas the outer surface 214 which forms the external aerodynamic surface of the wing cover 210 is arcuate so as to conform exactly to an optimal aerodynamic profile. The inner surfaces 216, 217 of the first and second skins 211, 212 have a profile according to an optimal skin thickness design. The arcuate surface 214 may easily be formed upon an appropriately shaped mould tool.

It is generally preferable that the internal wing cover surface 216 is free from ramps such that spars, ribs and any stringers that may be required can more easily be attached, or bonded, to the wing cover 210. However, in areas where a significant increase or reduction in panel stiffness is required, then a small number of ramps may be formed on the internal surface of the wing cover. Since the majority of the ramps are located at the skin/core interface within the sandwich panel, it is generally possible to position the ramps on the internal surface of the wing cover at locations between the wing box ribs, where manufacturing tolerance and assembly alignment issues are minimal.

Since a sandwich panel is intrinsically more efficient than that of a stringer stiffened equivalent, there is a potential for weight savings to be realised. This allows for further optimisation of the wing box structure. However, the typical wing cover sandwich panel thickness will be approximately 35 to 40 mm, which is significantly thicker than a traditional wing cover. This may lead to a reduction in the available fuel volume within the aircraft wing box. However, at least some of this lost volume may be recovered through an overall reduction in the number of ribs required in the wing box. The intrinsically stiffer sandwich panel used for the wing cover allows for a greater spacing between adjacent stringers and ribs, and hence a fewer number of stringers and ribs overall will be required. In addition, joining of the ribs and spars to the wing covers is simplified, whilst maintaining the sealing required to use the internal wing box volume as a fuel tank. By reducing the number of parts required to join and seal between the ribs and spars and the wing covers, the internal volume of the wing box which may be used as the fuel tank can be increased.

In areas where the wing cover is subjected to high loads, it may be appropriate for the skins of the sandwich panel to converge, i.e. there is no core material in these regions. This design flexibility means that ramps will be required on the internal surface of the wing cover only in a very few areas.

The ribs and spars may be fastened to the wing covers using countersunk bolts which pass through both skins of the upper and lower wing covers. However, due to lightning strike issues it is preferable to use different types of fasteners, or even to do away with fasteners altogether. The use of a cored sandwich structure for the wing cover enables the use of incorporated fasteners, such as barrel nuts etc. Preferably, the spars and ribs are formed of composite materials similar or identical to those of the skins of the wing cover, and hence these may be bonded without the use of fasteners.

Composite materials are generally susceptible to moisture penetration, and so it is preferable that the outer skin of the sandwich panel wing cover is generally thicker than that of the inner skin. The outer skin is also generally more highly loaded than the inner skin, and so forming the outer skin thicker than the inner skin can have a beneficial effect in both of these areas. Additionally, damage to the wing cover will, in most cases, be limited to the outer skin of the sandwich panel wing cover. Therefore, by making the outer skin generally thicker than the inner skin will improve ease of repair of the sandwich panel wing cover.

The upper and lower sandwich panel wing covers for the aircraft wing box are preferably each formed as a single component. However, in some circumstances it may be preferable to form the upper and lower wing covers as a plurality of wing cover sections to be joined side by side.

A method of designing an aircraft wing will now be described. Initially, an outer aerodynamic profile of the wing will be defined and fixed. This sets the datums for the external surfaces of the upper and lower wing covers. At this stage, the design of the aircraft wing box is not known but the aerodynamics team can assume that the desired outer aerodynamic profile of the wing will not be altered during the structural design process of the wing. Based upon the selected outer aerodynamic profile of the wing a load profile of the wing can be constructed. Based upon the predicted loads, stress engineers can determine and fix the location of the internal surface of the upper and lower sandwich panel wing covers. Positioning of the internal surfaces of the wing covers can be defined based on the expected stress and design capabilities of sandwich panel structures.

At this stage, the detailed design of the upper and lower sandwich panel wing covers has not been defined, and neither has the detailed design of the front and rear spars, ribs and any stringers. In contrast to previous aircraft wing design, the detailed design of the upper and lower wing covers may be conducted substantially independently of the design of the spars, ribs and stringers. Accordingly, the detailed design of these sub-components can lead to an improved design solution as there is substantially no interdependence between the design of the sub-components. This enables concurrent detailed design of the upper and lower wing covers with the ribs and spars, and any stringers.

Based on the local panel buckling loads for the upper and lower wing covers, a nominal rib and stringer pitch may be defined. Thereafter, the internal structure of the sandwich panel wing covers may be optimised. Although detailed design of the wing sub-components will affect the loads in the other components, since the interface between the wing covers and the ribs, spars and any stringers has been fixed early on in the design stage the detailed design can be completed with far fewer iterations than has previously been the case. This significantly reduces the overall timescale and costs involved in designing the aircraft wing.

Although the invention has been described above with reference to one or more preferred embodiments, it will be appreciated that various changes or modifications may be made without departing from the scope of the invention as defined in the appended claims.

The invention claimed is:

1. An aircraft wing cover comprising an integrally stiffened sandwich panel including first and second skins sandwiching a core layer, wherein at least one of the skins has a plurality of spanwise extending integral regions of increased thickness accommodated by corresponding regions of decreased thickness in the core.

2. An aircraft wing cover according to claim 1, wherein at least one of the skins has a chordwise extending integral region of increased thickness accommodated by a region of decreased thickness in the core.

3. An aircraft wing cover according to claim 1, wherein the skins have a laminate construction.

4. An aircraft wing cover according to claim 3, wherein the regions of increased skin thickness include a ramp to a region having a greater number of laminate plies.

5. An aircraft wing cover according to claim 1, wherein the skins comprise fibre reinforced plastic.

6. An aircraft wing cover according to claim 1, wherein the core comprises a hollow cell material.

7. An aircraft wing structure comprising a front spar, a rear spar, a plurality of chordwise ribs, and upper and lower wing covers, wherein the wing covers are in accordance with claim 1 and are fixed to the spars and ribs.

8. A method of fabricating an aircraft wing cover, the method comprising the steps of:
   a) forming first and second skins; and
   b) forming a sandwich panel comprising the first and second skins sandwiching a core layer, wherein at least one of the skins has a plurality of spanwise extending integral regions of increased thickness accommodated by corresponding regions of decreased thickness in the core.

9. A method according to claim 8, wherein in step a) each skin is formed by laying up a series of plies to form a laminate skin.

10. A method according to claim 9, wherein the plies are laid on a mould tool to accurately define the outer surface of each skin.

11. A method according to claim 9, wherein a greater number of plies are provided in the lay-up in the region of increased skin thickness.

12. A method according to claim 8, wherein the skins comprise fibre reinforced plastic.

13. A method according to claim 8, wherein the core comprises a hollow cell material.

14. A method according to claim 8, wherein step b) comprises arranging the skins so as to define a space between them, and filling the space with material to form the core layer sandwiched by the skins.

15. A method according to claim 14, wherein a foam is introduced into the space between the skins and allowed to cure.

16. A method according to claim 8, wherein step b) comprises forming a core layer, and arranging the skins so as to sandwich the core.

17. A method according to claim 16, wherein a block of open cell material is machined or cut to a profile substantially matching the inner surfaces of the skins.

18. A method of designing an aircraft wing, comprising the steps of:
   i) defining and fixing an outer aerodynamic profile of the wing;
   ii) predicting loads on the wing based on the wing profile;
   iii) determining and fixing outer surfaces of two integrally stiffened sandwich panels which will form upper and lower covers for the wing based on the predicted loads; and then
   iv) detailed designing of the integrally stiffened sandwich panels, which each include first and second skins sandwiching a core layer, wherein at least one of the skins has a plurality of spanwise extending integral regions of increased thickness accommodated by corresponding regions of decreased thickness in the core.

19. A method according to claim 18, further comprising the step of:
   v) detailed designing of wing ribs and spars simultaneously with step iv).

20. An integrally stiffened sandwich panel for an aircraft wing cover comprising:

first and second skins sandwiching a core layer,
wherein at least one of the skins has first and second span wise extending regions, and the first span wise ending region is thicker than the second span wise extending region, and
the core layer has third and fourth span wise extending regions wherein the third span wise region is thinner than the fourth span wise region, wherein the third span wise region is adjacent the first span wise region along a cross section of the panel and the second span wise region is adjacent the fourth span wise region along another cross section of the panel.

* * * * *